(12) United States Patent  
Thyagarajan

(10) Patent No.: US 7,782,960 B2
(45) Date of Patent: *Aug. 24, 2010

(54) DCT COMPRESSION USING GOLOMB-RICE CODING

(75) Inventor: Kadayam Thyagarajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 592 days.

This patent is subject to a terminal disclaimer.

(21) Appl. No.: 11/335,012

(22) Filed: Jan. 18, 2006

(65) Prior Publication Data

US 2006/0171465 A1    Aug. 3, 2006

Related U.S. Application Data

(60) Continuation of application No. 10/768,844, filed on Jan. 29, 2004, now Pat. No. 7,031,390, which is a division of application No. 09/895,618, filed on Jun. 29, 2001, now Pat. No. 6,735,254.

(51) Int. Cl.
*H04N 7/12*     (2006.01)
(52) U.S. Cl. .................................... 375/240.26
(58) Field of Classification Search ............ 375/240.01, 375/240.03, 240.26; *H04N 7/12*
See application file for complete search history.

(56) References Cited

U.S. PATENT DOCUMENTS

| 5,021,891 | A  | 6/1991  | Lee               |
| 5,036,457 | A  | 7/1991  | Glaser et al.     |
| 5,107,345 | A  | 4/1992  | Lee               |
| 5,452,104 | A  | 9/1995  | Lee               |
| 5,532,694 | A  | 7/1996  | Mayers et al.     |
| 5,583,500 | A  | 12/1996 | Allen et al.      |
| 5,603,012 | A  | 2/1997  | Sotheran          |
| 6,529,634 | B1 | 3/2003  | Thyagarajan et al.|
| 6,600,836 | B1 | 7/2003  | Thyagarajan et al.|

OTHER PUBLICATIONS

Szpankowski, W, "Asymptotic Average Redundancy of Huffman (and Other) Block Codes", Nov. 2000, IEEE Transactions on Information Theory, vol. 46, No. 7, pp. 2434-2443.*

* cited by examiner

*Primary Examiner*—Young Lee
(74) *Attorney, Agent, or Firm*—Dang M. Vo; John Rickenbrode

(57) ABSTRACT

An apparatus and method for encoding quantized frequency represented data, the data including zero and non-zero represented data. For zero represented data, a zero run length is determined. A Golomb parameter is determined as a logarithmic function of the zero run length. A quotient is encoded as a function of the zero run length and the Golomb parameter. A remainder is encoded as a function of the zero run length, the Golomb parameter and the quotient. The coded quotient and the coded remainder are concatenated.

40 Claims, 10 Drawing Sheets

DCT COMPRESSION USING GOLOMB-RICE CODING

CLAIM OF PRIORITY UNDER 35 U.S.C. §120

The present Application for Patent is a Continuation of patent application Ser. No. 10/768,844 entitled "DCT Compression Using Golomb-Rice Coding" filed Jan. 29, 2004, now U.S. Pat. No. 7,031,390, which is a divisional of U.S. patent application Ser. No. 09/895,618 entitled "DCT Compression Using Golomb-Rice Coding" filed Jun. 29, 2001, now issued as U.S. Pat. No. 6,735,254 and assigned to the assignee hereof and hereby expressly incorporated by reference herein.

BACKGROUND OF THE INVENTION

I. Field of the Invention

The present invention relates to image processing and compression. More specifically, the present invention relates to a coding of DCT coefficients using Golomb-Rice.

II. Description of the Related Art

Digital picture processing has a prominent position in the general discipline of digital signal processing. The importance of human visual perception has encouraged tremendous interest and advances in the art and science of digital picture processing. In the field of transmission and reception of video signals, such as those used for projecting films or movies, various improvements are being made to image compression techniques. Many of the current and proposed video systems make use of digital encoding techniques. Aspects of this field include image coding, image restoration, and image feature selection. Image coding represents the attempts to transmit pictures of digital communication channels in an efficient manner, making use of as few bits as possible to minimize the band width required, while at the same time, maintaining distortions within certain limits. Image restoration represents efforts to recover the true image of the object. The coded image being transmitted over a communication channel may have been distorted by various factors. Source of degradation may have arisen originally in creating the image from the object. Feature selection refers to the selection of certain attributes of the picture. Such attributes may be required in the recognition, classification, and decision in a wider context.

Digital encoding of video, such as that in digital cinema, is an area that benefits from improved image compression techniques. Digital image compression may be generally classified into two categories: loss-less and lossy methods. A loss-less image is recovered without any loss of information. A lossy method involves an irrecoverable loss of some information, depending upon the compression ratio, the quality of the compression algorithm, and the implementation of the algorithm. Generally, lossy compression approaches are considered to obtain the compression ratios desired for a cost-effective digital cinema approach. To achieve digital cinema quality levels, the compression approach should provide a visually loss-less level of performance. As such, although there is a mathematical loss of information as a result of the compression process, the image distortion caused by this loss should be imperceptible to a viewer under normal viewing conditions.

Existing digital image compression technologies have been developed for other applications, namely for television systems. Such technologies have made design compromises appropriate for the intended application, but do not meet the quality requirements needed for cinema presentation.

Digital cinema compression technology should provide the visual quality that a moviegoer has previously experienced. Ideally, the visual quality of digital cinema should attempt to exceed that of a high-quality release print film. At the same time, the compression technique should have high coding efficiency to be practical. As defined herein, coding efficiency refers to the bit rate needed for the compressed image quality to meet a certain qualitative level. Moreover, the system and coding technique should have built-in flexibility to accommodate different formats and should be cost effective; that is, a small-sized and efficient decoder or encoder process.

Many compression techniques available offer significant levels of compression, but result in a degradation of the quality of the video signal. Typically, techniques for transferring compressed information require the compressed information to be transferred at a constant bit rate.

One compression technique capable of offering significant levels of compression while preserving the desired level of quality for video signals utilizes adaptively sized blocks and sub-blocks of encoded Discrete Cosine Transform (DCT) coefficient data. This technique will hereinafter be referred to as the Adaptive Block Size Discrete Cosine Transform (ABSDCT) method. This technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilize what is referred to as "intra-frame" encoding, where each frame of image data is encoded without regard to the content of any other frame. Using the ABSDCT technique, the achievable data rate may be reduced from around 1.5 billion bits per second to approximately 50 million bits per second without discernible degradation of the image quality.

The ABSDCT technique may be used to compress either a black and white or a color image or signal representing the image. The color input signal may be in a YIQ format, with Y being the luminance, or brightness, sample, and I and Q being the chrominance, or color, samples for each 4:4:4 or alternate format. Other known formats such as the YUV, $YC_bC_r$ or RGB formats may also be used. Because of the low spatial sensitivity of the eye to color, most research has shown that a sub-sample of the color components by a factor of four in the horizontal and vertical directions is reasonable. Accordingly, a video signal may be represented by four luminance components and two chrominance components.

Using ABSDCT, a video signal will generally be segmented into blocks of pixels for processing. For each block, the luminance and chrominance components are passed to a block interleaver. For example, a 16×16 (pixel) block may be presented to the block interleaver, which orders or organizes the image samples within each 16×16 block to produce blocks and composite sub-blocks of data for discrete cosine transform (DCT) analysis. The DCT operator is one method of converting a time and spatial sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the video source. After the DCT is performed, most of the video signal energy tends to be concentrated in a few DCT coefficients. An additional transform, the Differential Quad-Tree Transform (DQT), may be used to reduce the redundancy among the DCT coefficients.

For the 16×16 block and each sub-block, the DCT coefficient values and the DQT value (if the DQT is used) are analyzed to determine the number of bits required to encode the block or sub-block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order into a 16×16 block. The DCT/DQT coefficient values may then undergo frequency weighting, quantization, and coding (such as variable length coding) in preparation for transmission. Although the ABSDCT technique described above performs remarkably well, it is computationally intensive. Thus, compact hardware implementation of the technique may be difficult.

Variable length coding has been accomplished in the form of run length and size. Other compression methods, such as Joint Photographic Experts Group (JPEG) or Moving Picture Experts Group (MPEG-2), use a standard zig-zag scanning method over the entire processed block size. Using ABSDCT, however, different block sizes are generated, based on the variance within blocks of data. Some coding methods, such as Huffman codes, consist of a run of zeros followed by a non-zero coefficient. Huffman codes, however, are more optimal when the probabilities of the source symbols are negative powers of two. However, in the case of the run-length/size pairs, the symbol probabilities are seldom negative powers of two.

Further, Huffman coding requires a code book of pre-computed code words to be stored. The size of the code book can be prohibitively large. Also, the longest code word may be prohibitively long. Hence, use of Huffman coding for the run-length/size pair symbols is not very efficient.

SUMMARY OF THE INVENTION

An apparatus and method to encode the ran-lengths and amplitude of the quantized DCT coefficients in a lossless manner to achieve compression is described. Specifically, Golomb-Rice coding is used to encode both zero runs and non-zero amplitudes of the DCT coefficients after quantization. It is found that the use of a scheme taking advantage of an exponential distribution of data, such as Golomb-Rice coding, allows for higher coding efficiencies than alternate schemes.

The present invention is a quality based system and method of image compression that utilizes adaptively sized blocks and sub-blocks of Discrete Cosine Transform coefficient data and a quality based quantization scale factor. A block of pixel data is input to an encoder. The encoder comprises a block size assignment (BSA) element, which segments the input block of pixels for processing. The block size assignment is based on the variances of the input block and further subdivided blocks. In general, areas with larger variances are subdivided into smaller blocks, and areas with smaller variances are not be subdivided, provided the block and sub-block mean values fall into different predetermined ranges. Thus, first the variance threshold of a block is modified from its nominal value depending on its mean value, and then the variance of the block is compared with a threshold, and if the variance is greater than the threshold, then the block is subdivided.

The block size assignment is provided to a transform element, which transforms the pixel data into frequency domain data. The transform is performed only on the block and sub-blocks selected through block size assignment. The transform data then undergoes scaling through quantization and serialization. Quantization of the transform data is quantized based on an image quality metric, such as a scale factor that adjusts with respect to contrast, coefficient count, rate distortion, density of the block size assignments, and/or past scale factors. Serialization, such as zig-zag scanning, is based on creating the longest possible run lengths of the same value. The stream of data is then coded by a variable length coder in preparation for transmission. Coding based on an exponential distribution, such as Golomb-Rice encoding, is utilized. Specifically, for zero represented data, a zero run length is determined. A Golomb parameter is determined as a function of the zero run length. A quotient is encoded as a function of the zero run length and the Golomb parameter. A remainder is encoded as a function of the zero run length, the Golomb parameter and the quotient. The coded quotient and the coded remainder are concatenated. For non-zero represented data, the nonzero data is encoded as a function of the non-zero data value and the sign of the non-zero data value.

The encoded data is sent through a transmission channel to a decoder, where the pixel data is reconstructed in preparation for display.

Accordingly, it is an aspect of an embodiment to not require apriori code generation.

It is another aspect of an embodiment to not require the use of an extensive code book to be stored.

It is another aspect of an embodiment to reduce the size needed for hardware implementation.

It is another aspect of an embodiment to achieve a high coding efficiency.

It is another aspect of an embodiment to take advantage of the exponential distribution of DCT data.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
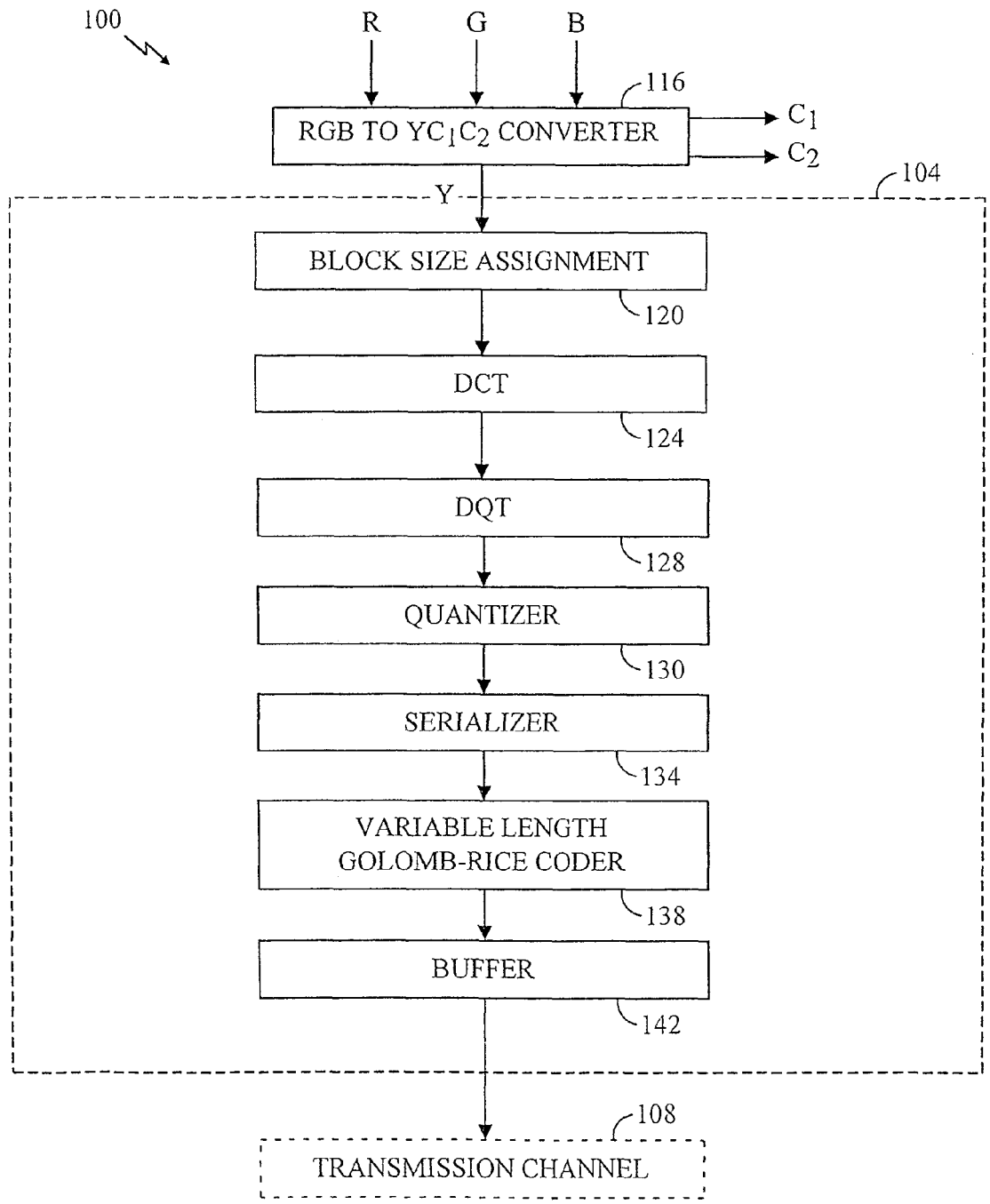
FIG. 1 is a block diagram of an encoder portion of an image compression and processing system.

In order to facilitate digital transmission of digital signals and enjoy the corresponding benefits, it is generally necessary to employ some form of signal compression. To achieve high compression in a resulting image, it is also important that high quality of the image be maintained. Furthermore, computational efficiency is desired for compact hardware implementation, which is important in many applications.

Before one embodiment of the invention is explained in detail, it is to be understood that the invention is not limited in its application to the details of the construction and the arrangement of the components set forth in the following description or illustrated in the drawings. The invention is capable of other embodiments and are carried out in various ways. Also, it is understood that the phraseology and terminology used herein is for purpose of description and should not be regarded as limiting.

Image compression employed in an aspect of an embodiment is based on discrete cosine transform (DCT) techniques, such as that disclosed in co-pending U.S. patent application "Contrast Sensitive Variance Based Adaptive Block Size DCT Image Compression", Ser. No. 09/436,085 filed on Nov. 8, 1999, assigned to the assignee of the present application and incorporated herein by reference. Image Compression and Decompression systems utilizing the DCT are described in co-pending U.S. patent application "Quality Based Image Compression", Ser. No. 09/494,192, filed on Jan. 28, 2000, assigned to the assignee of the present application and incorporated herein by reference. Generally, an image to be processed in the digital domain is composed of pixel data divided into an array of non-overlapping blocks, N×N in size. A two-dimensional DCT may be performed on each block. The two-dimensional DCT is defined by the following relationship:

$$X(k,l) = \frac{\alpha(k)\beta(l)}{\sqrt{N*M}} \sum_{m=0}^{N-1} \sum_{n=0}^{N-1} x(m,n) \cos\left[\frac{(2m+1)\pi k}{2N}\right]$$
$$\cos\left[\frac{(2n+1)\pi l}{2N}\right], 0 \le k, l \le N-1$$

where $$\alpha(k), \beta(k) = \begin{cases} 1, & \text{if } k = 0 \\ \sqrt{2}, & \text{if } k \ne 0 \end{cases}, \text{ and}$$

$x(m,n)$ is the pixel at location $(m,n)$ within an $N \times M$ block, and $X(k,l)$ is the corresponding DCT coefficient.

Since pixel values are non-negative, the DCT component $X(0,0)$ is always positive and usually has the most energy. In fact, for typical images, most of the transform energy is concentrated around the component $X(0,0)$. This energy compaction property is what makes the DCT technique such an attractive compression method.

The image compression technique utilizes contrast adaptive coding to achieve further bit rate reduction. It has been observed that most natural images are made up of relatively slow varying flat areas, and busy areas such as object boundaries and high-contrast texture. Contrast adaptive coding schemes take advantage of this factor by assigning more bits to the busy areas and less bits to the less busy areas.

Contrast adaptive methods utilize intraframe coding (spatial processing) instead of interframe coding (spatio-temporal processing). Interframe coding inherently requires multiple frame buffers in addition to more complex processing circuits. In many applications, reduced complexity is needed for actual implementation. Intraframe coding is also useful in a situation that can make a spatio-temporal coding scheme break down and perform poorly. For example, 24 frame per second movies can fall into this category since the integration time, due to the mechanical shutter, is relatively short. The short integration time allows a higher degree of temporal aliasing. The assumption of frame to frame correlation breaks down for rapid motion as it becomes jerky. Intraframe coding is also easier to standardize when both 50 Hz and 60 Hz power line frequencies are involved. Television currently transmits signals at either 50 Hz or 60 Hz. The use of an intraframe scheme, being a digital approach, can adapt to both 50 Hz and 60 Hz operation, or even to 24 frame per second movies by trading off frame rate versus spatial resolution.

For image processing purposes, the DCT operation is performed on pixel data that is divided into an array of non-overlapping blocks. Note that although block sizes are discussed herein as being N×N in size, it is envisioned that various block sizes may be used. For example, a N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g. 9×9.

Figure 2:
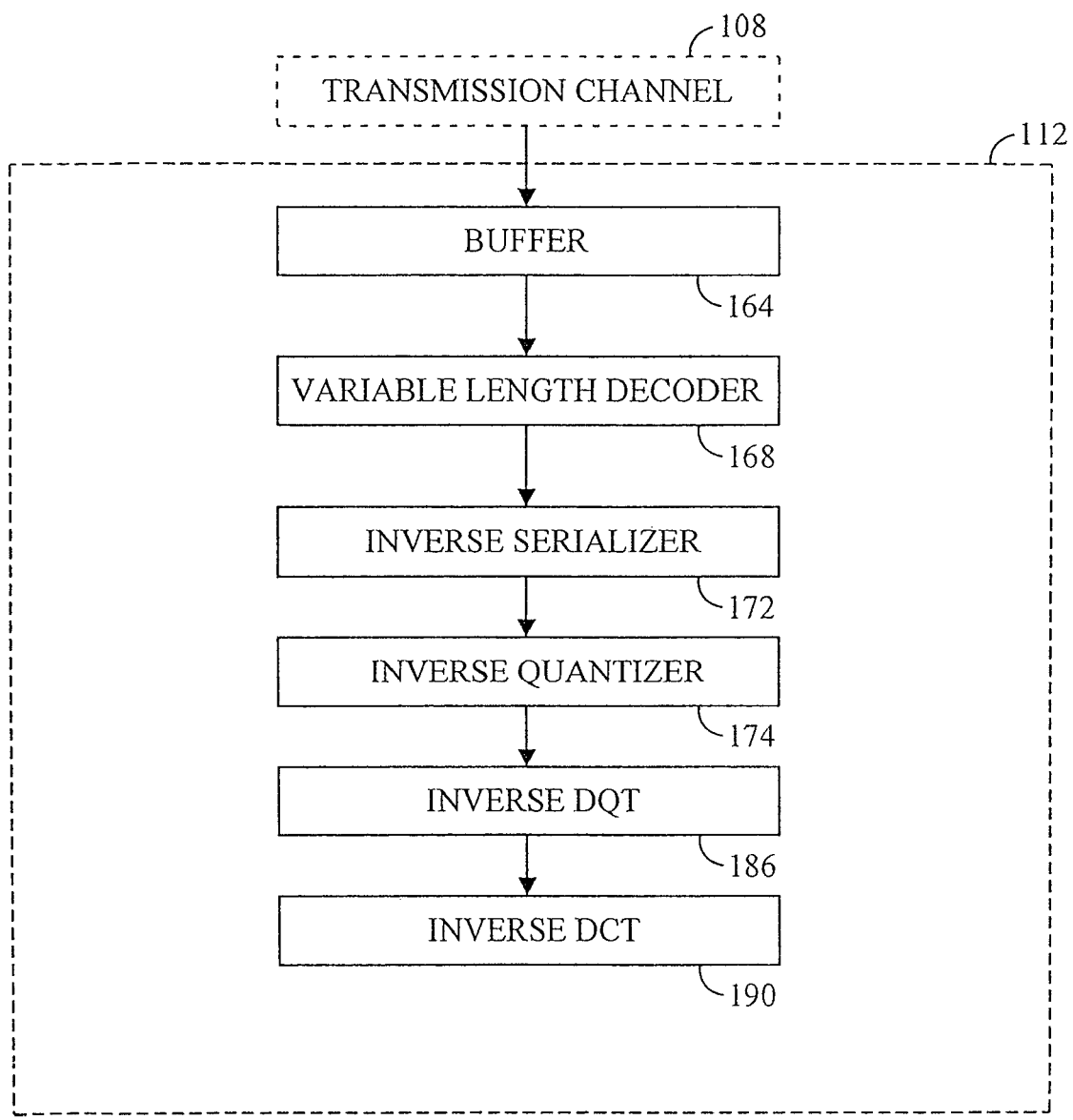
FIG. 2 is a block diagram of a decoder portion of an image compression and processing system.

FIGS. 1 and 2 illustrate an image processing system 100 incorporating the concept of configurable serializer. The image processing system 100 comprises an encoder 104 that compresses a received video signal. The compressed signal is transmitted using a transmission channel or a physical medium 108, and received by a decoder 112. The decoder 112 decodes the received encoded data into image samples, which may then be exhibited.

In general, an image is divided into blocks of pixels for processing. A color signal may be converted from RGB space to YC1C2 space using a RGB to YC1C2 converter 116, where Y is the luminance, or brightness, component, and C1 and C2 are the chrominance, or color, components. Because of the low spatial sensitivity of the eye to color, many systems sub-sample the C1 and C2 components by a factor of four in the horizontal and vertical directions. However, the sub-sampling is not necessary. A full resolution image, known as 4:4:4 format, may be either very useful or necessary in some applications such as those referred to as covering "digital cinema." Two possible YC1C2 representations are, the YIQ representation and the YUV representation, both of which are well known in the art. It is also possible to employ a variation of the YUV representation known as YCbCr. This may be further broken into odd and even components. Accordingly, in an embodiment the representation Y-even, Y-odd, Cb-even, Cb-odd, Cr-even, Cr-odd is used.

In a preferred embodiment, each of the even and odd Y, Cb, and Cr components is processed without sub-sampling. Thus, an input of each of the six components of a 16×16 block of pixels is provided to the encoder 104. For illustration purposes, the encoder 104 for the Y-even component is illustrated. Similar encoders are used for the Y-odd component, and even and odd Cb and Cr components. The encoder 104 comprises a block size assignment element 120, which performs block size assignment in preparation for video compression. The block size assignment element 120 determines the block decomposition of the 16×16 block based on the perceptual characteristics of the image in the block. Block size assignment subdivides each 16×16 block into smaller blocks, such as 8×8, 4×4, and 2×2, in a quad-tree fashion depending on the activity within a 16×16 block. The block size assignment element 120 generates a quad-tree data, called the PQR data, whose length can be between 1 and 21 bits. Thus, if block size assignment determines that a 16×16 block is to be divided, the R bit of the PQR data is set and is followed by four additional bits of Q data corresponding to the four divided 8×8 blocks. If block size assignment determines that any of the 8'8 blocks is to be subdivided, then four additional bits of P data for each 8×8 block subdivided are added.

Figure 3:
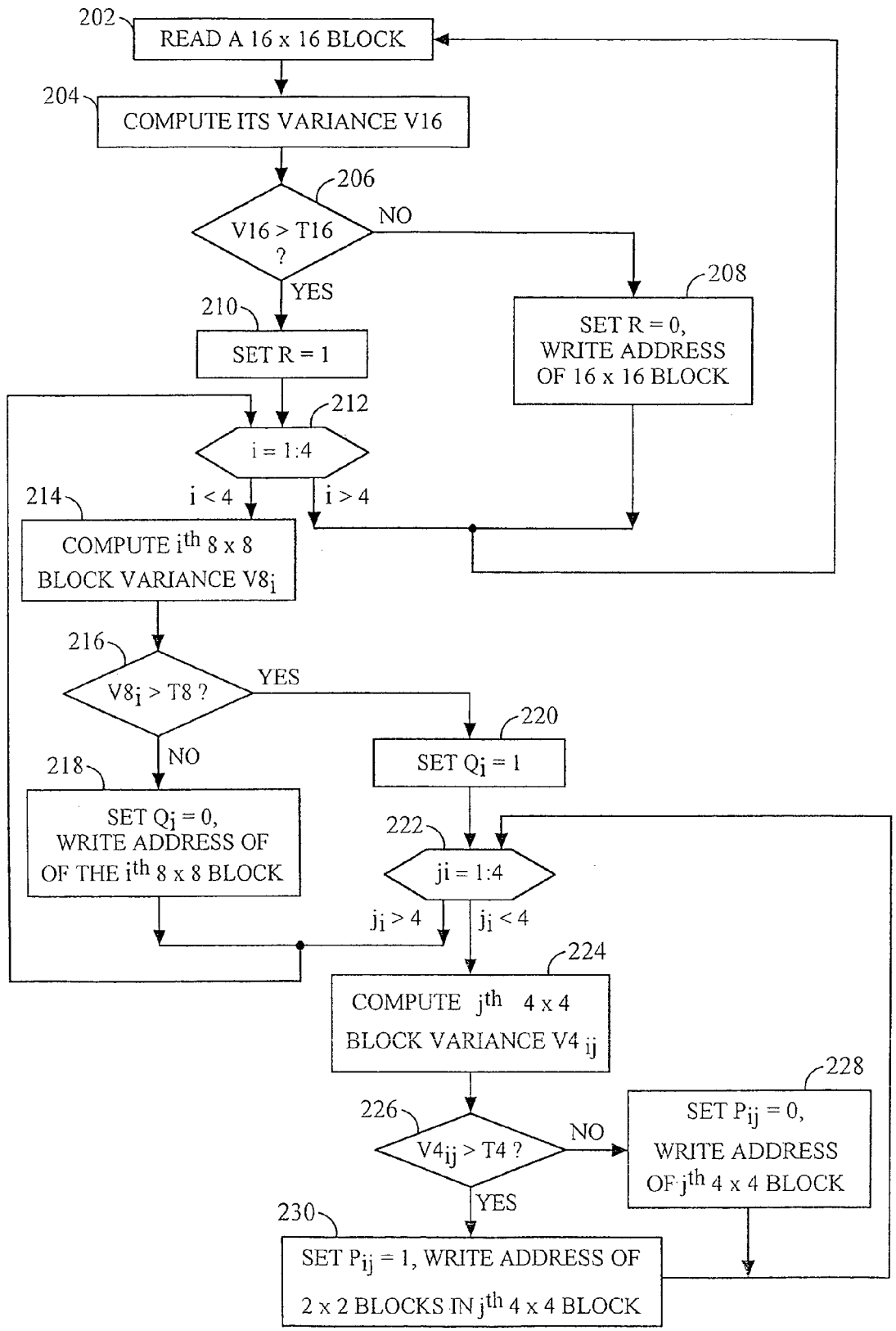
FIG. 3 is a flow diagram illustrating the processing steps involved in variance based block size assignment.

Referring now to FIG. 3, a flow diagram showing details of the operation of the block size assignment element 120 is provided. The variance of a block is used as a metric in the decision to subdivide a block. Beginning at step 202, a 16×16 block of pixels is read. At step 204, the variance, v16, of the 16×16 block is computed. The variance is computed as follows:

$$\text{var} = \frac{1}{N^2}\sum_{i=0}^{N-1}\sum_{j=0}^{N-1} x_{i,j}^2 - \left(\frac{1}{N^2}\sum_{i=0}^{N-1}\sum_{j=0}^{N-1} x_{i,j}\right)^2$$

where N=16, and $x_{ij}$ is the pixel in the $i^{th}$ row, $j^{th}$ column within the N×N block. At step 206, first the variance threshold T16 is modified to provide a new threshold T'16 if the mean value of the block is between two predetermined values, then the block variance is compared against the new threshold, T'16.

If the variance v16 is not greater than the threshold T16, then at step 208, the starting address of the 16×16 block is written into temporary storage, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, v8i, is computed, at step 214. At step 216, first the variance threshold T8 is modified to provide a new threshold T'8 if the mean value of the block is between two predetermined values, then the block variance is compared to this new threshold.

If the variance v8i is not greater than the threshold T8, then at step 218, the starting address of the 8×8 block is written into temporary storage, and the corresponding Q bit, Qi, is set to 0. The next 8×8 block is then processed. If the variance v8i is greater than the threshold T8, then at step 220, the corresponding Q bit, Qi, is set to 1 to indicate that the 8×8 block is to be subdivided into four 4×4 blocks.

The four 4×4 blocks, ji=1:4, are considered sequentially for further subdivision, as shown in step 222. For each 4×4 block, the variance, v4ij, is computed, at step 224. At step 226, first the variance threshold T4 is modified to provide a new threshold T'4 if the mean value of the block is between two predetermined values, then the block variance is compared to this new threshold.

If the variance v4ij is not greater than the threshold T4, then at step 228, the address of the 4×4 block is written, and the corresponding P bit, Pij, is set to 0. The next 4×4 block is then processed. If the variance v4ij is greater than the threshold T4, then at step 230, the corresponding P bit, Pij, is set to 1 to indicate that the 4×4 block is to be subdivided into four 2×2 blocks. In addition, the address of the 4 2×2 blocks are written into temporary storage.

The thresholds T16, T8, and T4 may be predetermined constants. This is known as the hard decision. Alternatively, an adaptive or soft decision may be implemented. For example, the soft decision varies the thresholds for the variances depending on the mean pixel value of the 2N×2N blocks, where N can be 8, 4, or 2. Thus, functions of the mean pixel values, may be used as the thresholds.

For purposes of illustration, consider the following example. Let the predetermined variance thresholds for the Y component be 50, 1100, and 880 for the 16×16, 8×8, and 4×4 blocks, respectively. In other words, T16=50, T8=1100, and 880. Let the range of mean values be 80 and 100. Suppose the computed variance for the 16×16 block is 60. Since 60 is greater than T16, and the mean value 90 is between 80 and 100, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block.

Note that a similar procedure is used to assign block sizes for the luminance component Y-odd and the color components, Cb-even, Cb-odd, Cr-even and Cr-odd. The color components may be decimated horizontally, vertically, or both.

Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

Referring back to FIG. 1, the PQR data, along with the addresses of the selected blocks, are provided to a DCT element 124. The DCT element 124 uses the PQR data to perform discrete cosine transforms of the appropriate sizes on the selected blocks. Only the selected blocks need to undergo DCT processing.

The image processing system 100 also comprises DQT element 128 for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients.

The DQT element 128 performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients within an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

The transform coefficients (both DCT and DQT) are provided to a quantizer for quantization. In a preferred embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual or optical system is more sensitive to, and to de-emphasize samples having frequency content that the visual or optical system is less sensitive to. The weights may also be designed based on factors such as viewing distances, etc.

The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is incorporated herein by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8 * DCT(i, j)}{fwm(i, j) * q} \pm \frac{1}{2} \right\rfloor$$

where DCT(i,j) is the input DCT coefficient, fwm(i,j) is the frequency weighting mask, q is the scale factor, and DCTq(i, j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr components.

The block of pixel data and frequency weighting masks are then scaled by a quantizer 130, or a scale factor element. Quantization of the DCT coefficients reduces a large number of them to zero which results in compression. In a preferred embodiment, there are 32 scale factors corresponding to average bit rates. Unlike other compression methods such as MPEG2, the average bit rate is controlled based on the quality of the processed image, instead of target bit rate and buffer status.

To increase compression further, the quantized coefficients are provided to a scan serializer 134. The serializer 134 scans the blocks of quantized coefficients to produce a serialized stream of quantized coefficients. Zig-zag scans, column scanning, or row scanning may be employed. A number of different zigzag scanning patterns, as well as patterns other than zigzag may also be chosen. A preferred technique employs 8×8 block sizes for the zigzag scanning. A zigzag scanning of the quantized coefficients improves the chances of encountering a large run of zero values. This zero run inherently has a decreasing probability, and may be efficiently encoded using Huffman codes.

The stream of serialized, quantized coefficients is provided to a variable length coder 138. A run-length coder separates the quantized coefficients between the zero from the non-zero coefficients, and is described in detail with respect to FIG. 6. In an embodiment, Golomb-Rice coding is utilized. Golomb-Rice encoding is efficient in coding non-negative integers with an exponential distribution. Using Golomb codes is more optimal for compression in providing shorter length codes for exponentially distributed variables.

In Golomb encoding run-lengths, Golomb codes are parameterized by a non-negative integer m. For example, given a parameter m, the Golomb coding of a positive integer n is represented by the quotient of n/m in unary code followed by the remainder represented by a modified binary code, which is $\lfloor \log_2 m \rfloor$ bits long if the remainder is less than $2^{\lceil \log_2 m \rceil}-m$, otherwise, $\lceil \log_2 m \rceil$ bits long. Golomb-Rice coding is a special case of Golomb coding where the parameter m is expressed as $m=2^k$. In such a case the quotient of n/m is obtained by shifting the binary representation of the integer n to the right by k bits, and the remainder of n/m is expressed by the least k bits of n. Thus, the Golomb-Rice code is the concatenation of the two. Golomb-Rice coding can be used to encode both positive and negative integers with a two-sided geometric (exponential) distribution as given by $$p_\alpha(x) = c\alpha^{|x|} \tag{1}$$

In (1), $\alpha$ is a parameter that characterizes the decay of the probability of x, and c is a normalization constant. Since $p_\alpha(x)$ is monotonic, it can be seen that a sequence of integer values should satisfy $$p_\alpha(x_i=0) \geq p_\alpha(x_i=-1) \geq p_\alpha(x_i=+1) \geq p_\alpha(x_i=-2) \geq \tag{2}$$

Figure 4A:
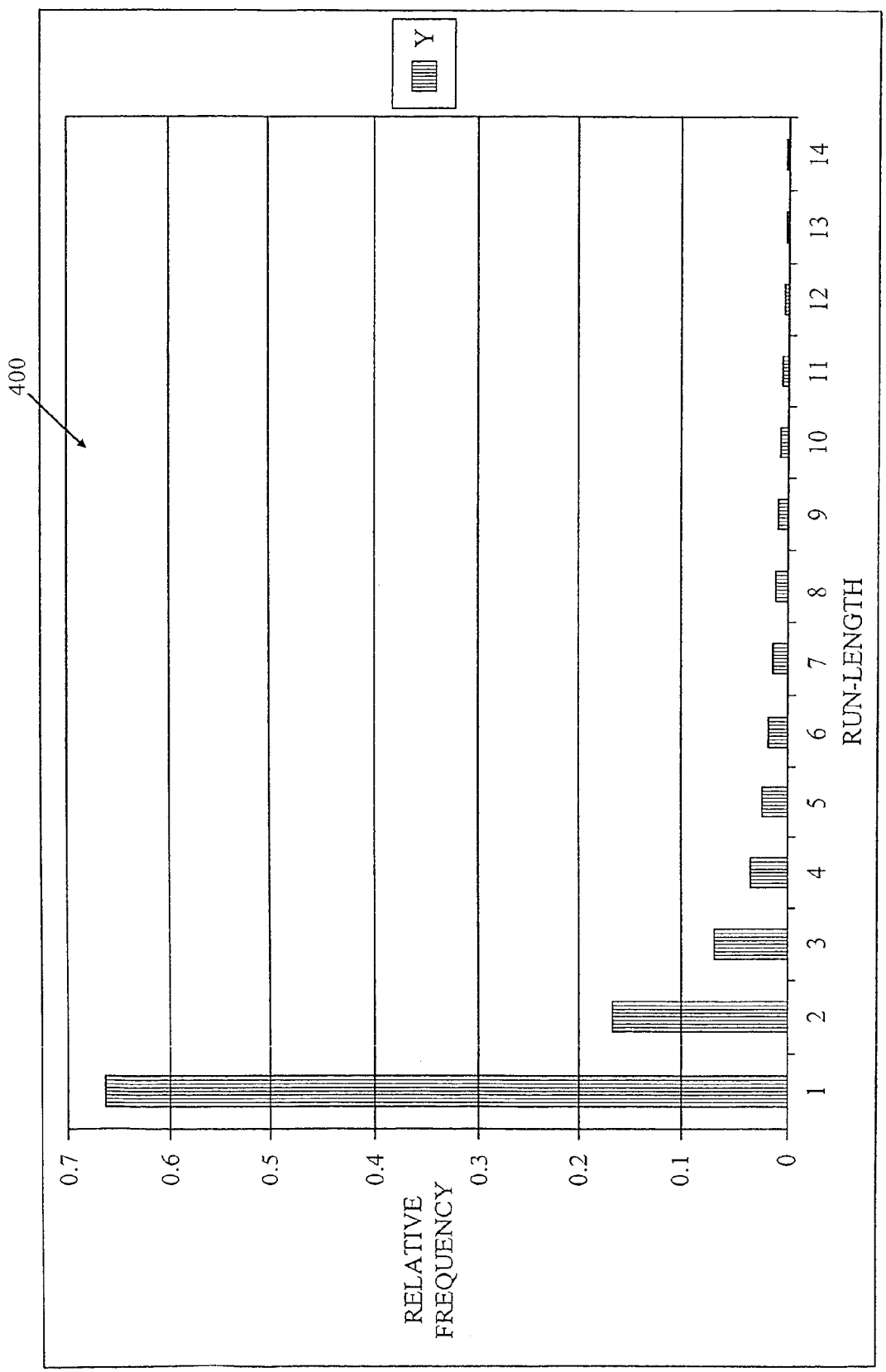
FIG. 4a illustrates an exponential distribution of the Y component of zero run-lengths in a DCT coefficient matrix.
Figure 4B:
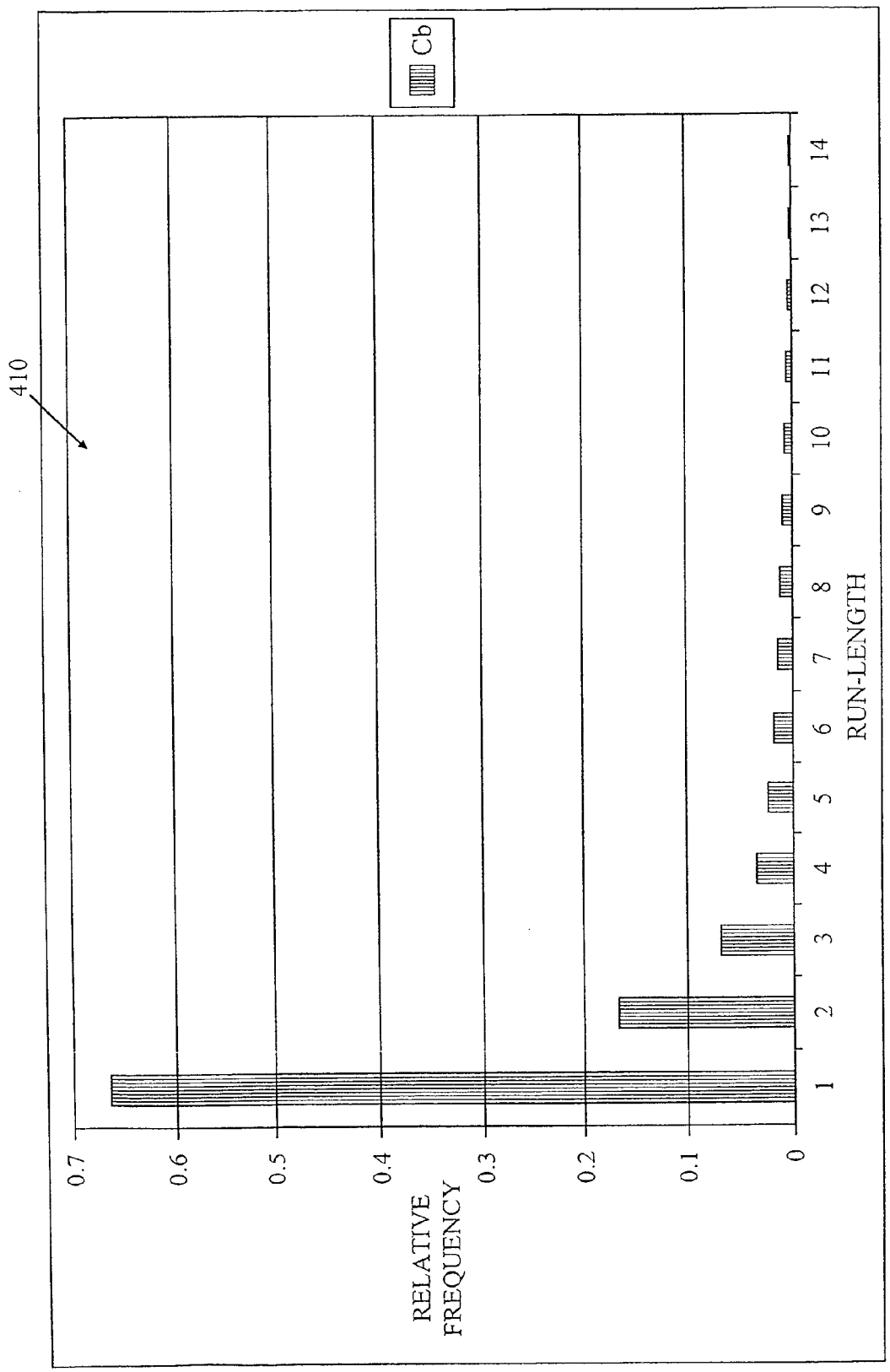
FIG. 4b illustrates an exponential distribution of the Cb component of zero run-lengths in a DCT coefficient matrix.
Figure 4C:
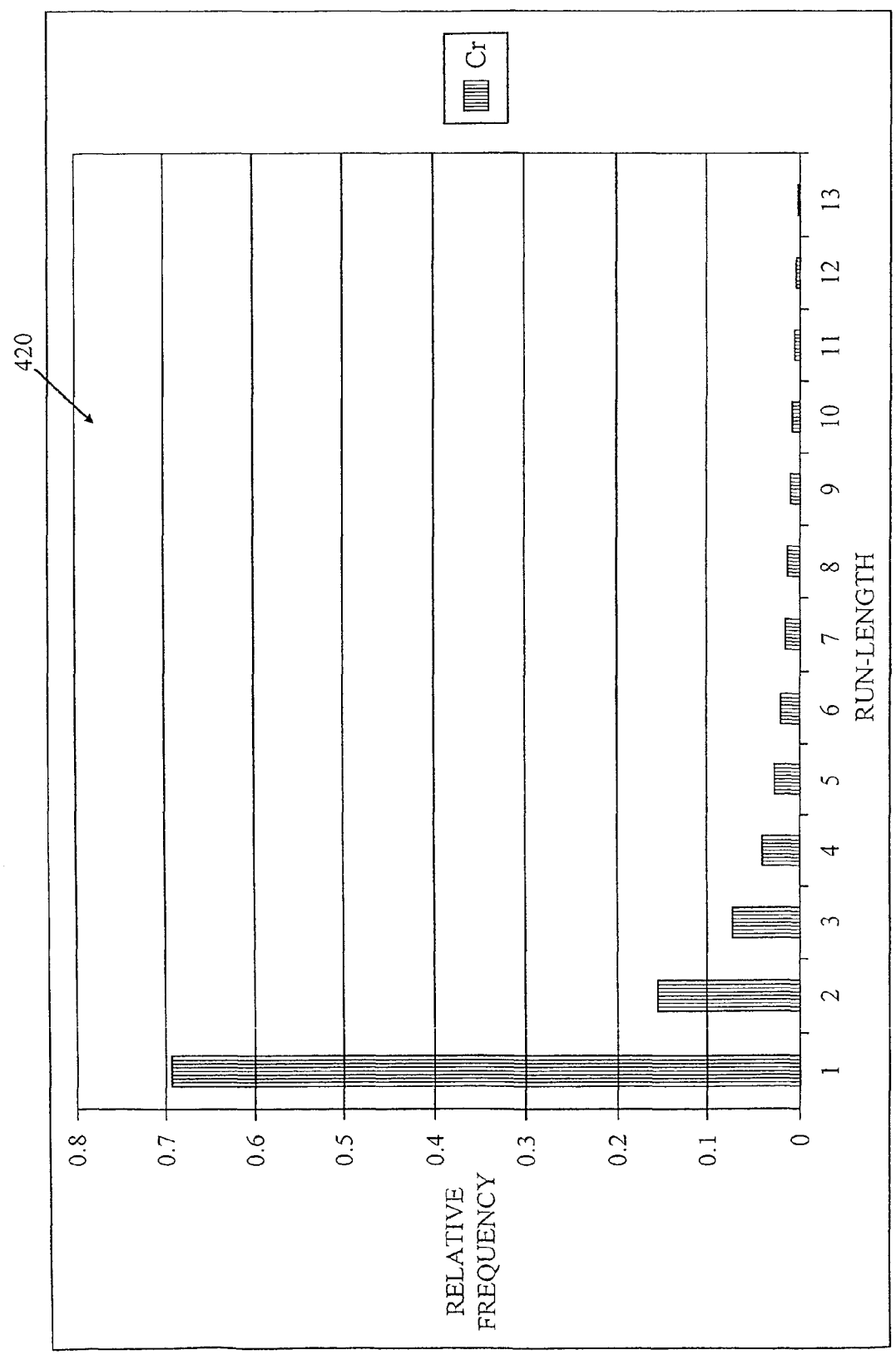
FIG. 4c illustrates an exponential distribution of the Cr component of zero run-lengths in a DCT coefficient matrix.
Figure 5A:
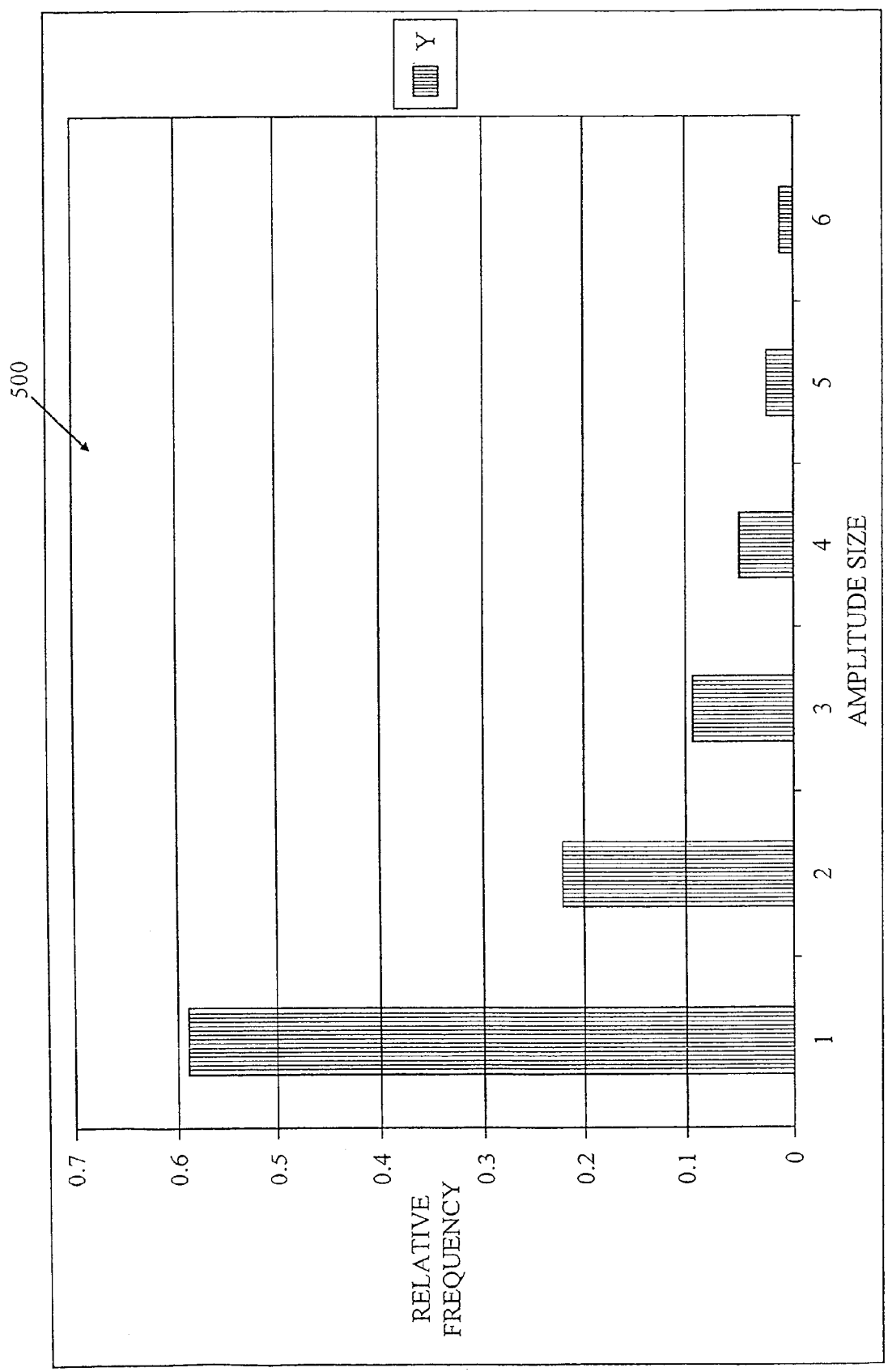
FIG. 5a illustrates an exponential distribution of the Y component of amplitude size in a DCT coefficient matrix.
Figure 5B:
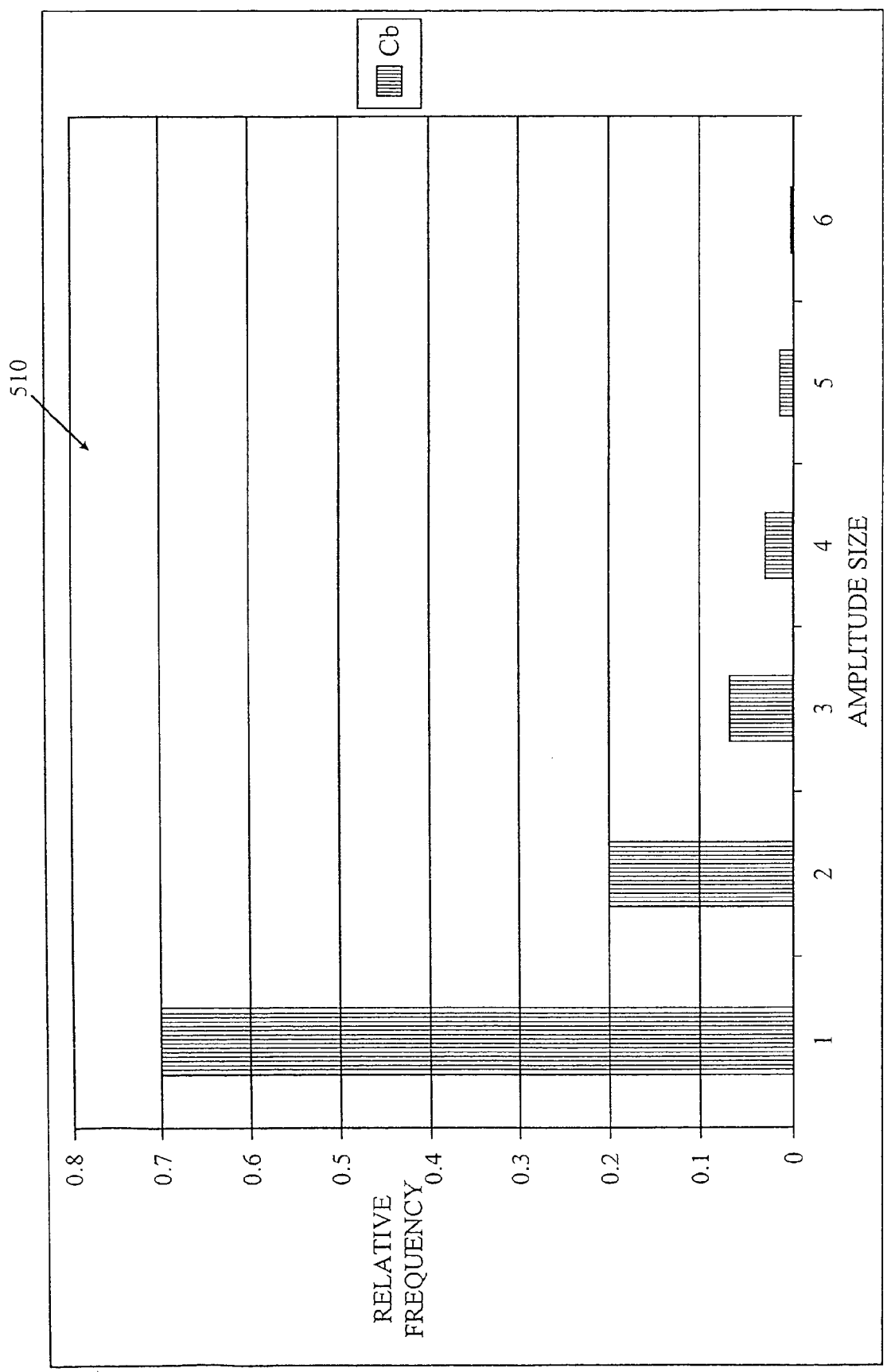
FIG. 5b illustrates an exponential distribution of the Cb component of amplitude size in a DCT coefficient matrix.
Figure 5C:
FIG. 5c illustrates an exponential distribution of the Cr component of amplitude size in a DCT coefficient matrix.

As illustrated in FIGS. 4*a*, 4*b*, 4*c* and 5*a*, 5*b*, 5*c*, both the zero-runs and amplitudes in a quantized DCT coefficient matrix have exponential distributions. The distributions illustrated in these figures are based on data from real images. FIG. 4*a* illustrates the Y component distribution 400 of zero run-lengths versus relative frequency. Similarly, FIGS. 4*b* and 4*c* illustrates the Cb and Cr component distribution, of zero run-lengths versus relative frequency 410 and 420, respectively. FIG. 5*a* illustrates the Y component distribution 500 of amplitude size versus relative frequency. Similarly, FIGS. 5*b* and 5*c* illustrates the Cb and Cr component distribution of amplitude size versus relative frequency, 510 and 520, respectively. Note that in FIGS. 5*a*, 5*b*, and 5*c* the plots represent the distribution of the size of the DCT coefficients. Each size represents a range of coefficient values. For example, a size value of four has the range {−15, −14, . . . −8, 8, . . . , 14, 15}, a total of 16 values. Similarly, a size value of ten has the range {−1023, −1022, . . . , −512, 512, . . . , 1022, 1023} a total of 1024 values. It is seen from FIGS. 4*a*, 4*b*, 4*c*, 5*a*, 5*b* and 5*c* that both run-lengths and amplitude size have exponential distributions. The actual distribution of the amplitudes can be shown to fit the following equation (3):

$$p(X_{k,l}) = \frac{\sqrt{2\lambda}}{2}\exp\{-\sqrt{2\lambda}|X_{k,l}|\}, k, l \neq 0 \tag{3}$$

In (3), $X_{k,l}$ represents the DCT coefficient corresponding to frequency k and l in the vertical and horizontal dimensions, respectively, and the mean $$\mu_x = \frac{1}{\sqrt{2\lambda}},$$

variance $$\sigma_x^2 = \frac{1}{2\lambda}.$$

Accordingly, the use of Golomb-Rice coding in the manner described is more optimal in processing data in DCTs.

Although the following is described with respect to compression of image data, the embodiments are equally applicable to embodiments compressing audio data. In compressing image data, the image or video signal may be, for example, either in RGB, or YIQ, or YUV, or Y Cb Cr components with linear or log encoded pixel values.

Figure 6:
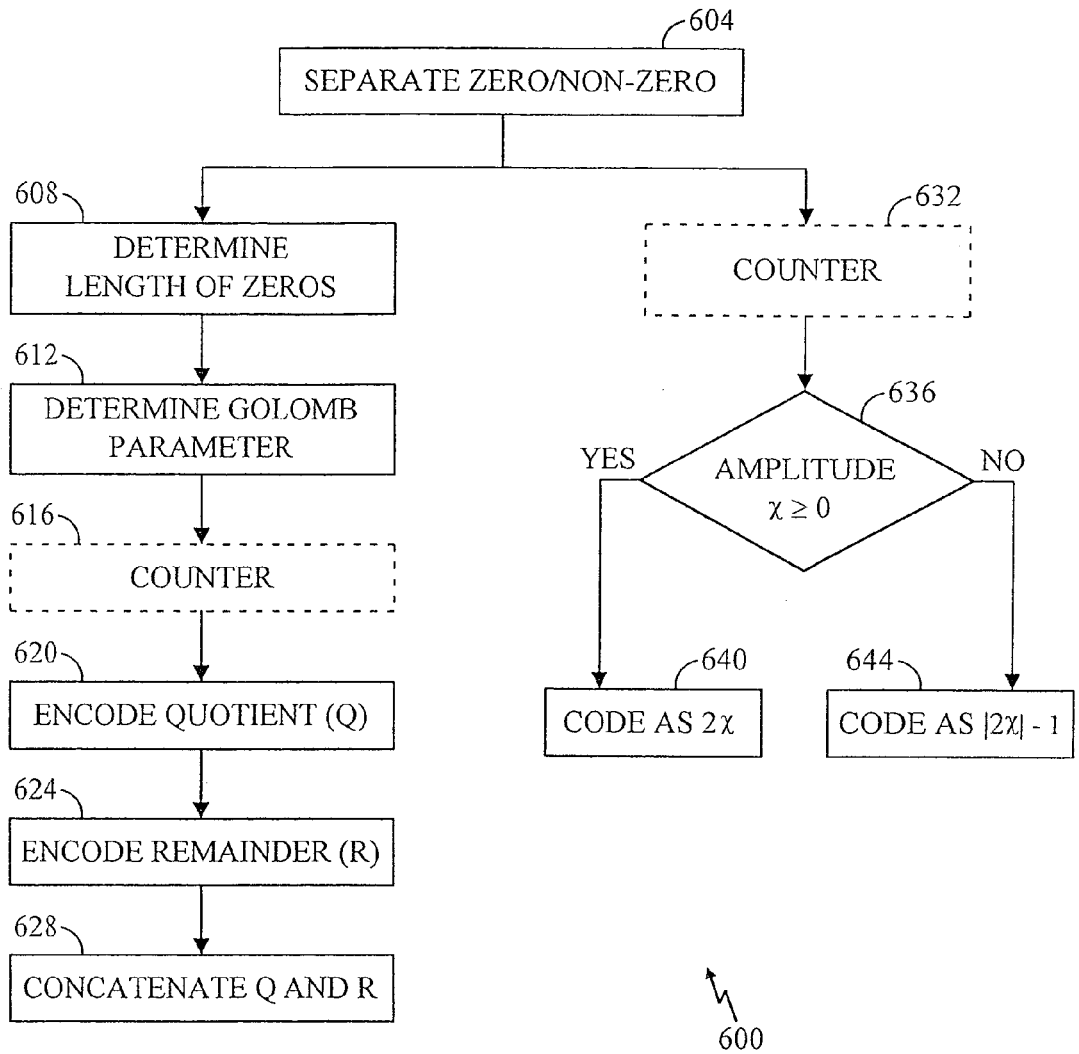
FIG. 6 illustrates a Golomb-Rice encoding process.

FIG. 6 illustrates the process 600 of encoding zero and non-zero coefficients. As the DCT matrix is scanned, the zero and non-zero coefficients are processed separately and separated 604. For zero data, the length of zero run is determined 608. Note that run-lengths are positive integers. For example, if the run-length is found to be n, then a Golomb parameter m is determined 612. In an embodiment, the Golomb parameter is determined as a function of the run length. In another embodiment, the Golomb parameter (m) is determined by the following equation (4)

$$m = \lceil \log_2 n \rceil \quad (4)$$

Optionally, the length of run-lengths and associated Golomb parameters are counted 616 by a counter or register. To encode the run length of zeros n, a quotient is encoded 620. In an embodiment, the quotient is determined as a finction of the run length of zeros and the Golomb parameter. In another embodiment, the quotient (Q) is determined by the following equation (5):

$$Q = \lfloor n/2^m \rfloor \quad (5)$$

In an embodiment, the quotient Q is encoded in unary code, which requires Q+1 bits. Next, a remainder is encoded 624. In an embodiment, the remainder is encoded as a function of the run length and the quotient. In another embodiment, the remainder (R) is determined using the following equation (6):

$$R = n - 2^m Q \quad (6)$$

In an embodiment, the remainder R is encoded in an m-bit binary code. After, the quotient Q and the remainder R are determined, the codes for Q and R are concatenated 628 to represent an overall code for the run length of zeros n.

Nonzero coefficients are also encoded using Golomb-Rice. Since the coefficient amplitude can be positive or negative, it is necessary to use a sign bit and to encode the absolute value of a given amplitude. Given the amplitude of the non-zero coefficient being x, the amplitude may be expressed as a finction of the absolute value of the amplitude and the sign.

Accordingly, the amplitude may be expressed as y using the following equation (7):

$$y = \begin{cases} 2x, & \text{if } x \geq 0 \\ 2|x| - 1, & \text{otherwise} \end{cases} \quad (7)$$

Accordingly, the value of a non-zero coefficient is optionally counted by a counter, or register, 632. It is then determined 636 if the amplitude is greater than or equal to zero. If it is, the value is encoded 640 as twice the given value. If not, the value is encoded 644 as one less than twice the absolute value. It is contemplated that other mapping schemes may also be employed. The key is that an extra bit to distinguish the sign of the value is not needed.

Encoding amplitudes as expressed by equation (7) results in that positive values of x being even integers and negative values become odd integers. Further, this mapping preserves the probability assignment of x as in (2). An advantage of encoding as illustrated in equation (7) allows one to avoid using a sign bit to represent positive and negative numbers. After the mapping is done, y is encoded in the same manner as was done for the zero-run. The procedure is continued until all coefficients have been scanned in the current block.

It is important to recognize that although embodiments of the invention are determine values of coefficients and run lengths as a finction of equations (1)-(7), the exact equations (1)-(7) need not be used. It is the exploitation of the exponential distribution of Golomb-Rice encoding and of DCT coefficients that allows for more efficient compression of image and audio data.

Since a zero-run after encoding is not distinguishable from a non-zero amplitude, it may be necessary to use a special prefix code of fixed length to mark the occurrence of the first zero-run. It is common to encounter all zeros in a block after a non-zero amplitude has been encountered. In such cases, it may be more efficient to use a code referring to end-of-block (EOB) code rather than Golomb-Rice code. The EOB code is again, optionally, a special fixed length code.

According to equation (1) or (3), the probability distribution of the amplitude or run-length in the DCT coefficient matrix is parameterized by $\alpha$ or $\lambda$. The implication is that the coding efficiency may be improved if the context under which a particular DCT coefficient block arises. An appropriate Golomb-Rice parameter to encode the quantity of interest may then be used. In an embodiment, counters or registers are used for each run-length and amplitude size value to compute the respective cumulative values and the corresponding number of times that such a value occurs. For example, if the register to store the cumulative value and number of elements accumulated are $R_{rl}$ and $N_{rl}$, respectively, the following equation (6) may be used as the Rice-Golomb parameter to encode the run-length:

$$\left\lceil \log_2 \frac{R_{rl}}{N_{rl}} \right\rceil$$

(6) A similar procedure may be used for the amplitude.

Referring back to FIG. 1, the compressed image signal generated by the encoder 104 may be temporarily stored using a buffer 142, and then transmitted to the decoder 112 using the transmission channel 108. The transmission channel 108 may be a physical medium, such as a magnetic or optical storage device, or a wire-line or wireless conveyance process or apparatus. The PQR data, which contains the block size assignment information, is also provided to the decoder 112 (FIG. 2). The decoder 112 comprises a buffer 164 and a variable length decoder 168, which decodes the run-length values and the non-zero values. The variable length decoder 168 operates in a similar but opposite manner as that described in FIG. 6.

The output of the variable length decoder 168 is provided to an inverse serializer 172 that orders the coefficients according to the scan scheme employed. For example, if a mixture of zig-zag scanning, vertical scanning, and horizontal scanning were used, the inverse serializer 172 would appropriately re-order the coefficients with the knowledge of the type of scanning employed. The inverse serializer 172 receives the PQR data to assist in proper ordering of the coefficients into a composite coefficient block.

The composite block is provided to an inverse quantizer 174, for undoing the processing due to the use of the quantizer scale factor and the frequency weighting masks.

The coefficient block is then provided to an IDQT element 186, followed by an IDCT element 190, if the Differential Quad-tree transform had been applied. Otherwise, the coefficient block is provided directly to the IDCT element 190. The IDQT element 186 and the IDCT element 190 inverse transform the coefficients to produce a block of pixel data. The pixel data may then have to be interpolated, converted to RGB form, and then stored for future display.

Figure 7:
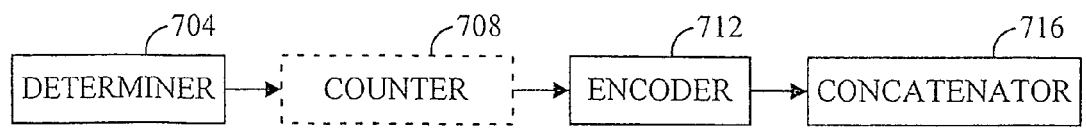
FIG. 7 illustrates an apparatus for Golomb-Rice encoding.

FIG. 7 illustrates an apparatus for Golomb-Rice encoding 700. The apparatus in FIG. 7 preferably implements a process as described with respect to FIG. 6. A determiner 704 determines a run length (n) and a Golomb parameter (m). Optionally, a counter or register 708 is used for each run-length and amplitude size value to compute the respective cumulative values and the corresponding number of times that such a value occurs. An encoder 712 encodes a quotient (Q) as a function of the run length and the Golomb parameter. The encoder 712 also encodes the remainder (R) as a function of the run length, Golomb parameter, and quotient. In an alternate embodiment, encoder 712 also encodes nonzero data as a function of the non-zero data value and the sign of the non-zero data value. A concatenator 716 is used to concatenate the Q value with the R value.

As examples, the various illustrative logical blocks, flowcharts, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

Other features and advantages of the invention are set forth in the following claims.

I claim:

1. A processor for encoding quantized frequency represented data, the processor configured to:
   determine a zero run length (n) of the data;
   determine a Golomb parameter (m) as a logarithmic function of the zero run length (n) by using an equation $m=\lceil \log_2 n \rceil$;
   encode a quotient (Q) as a function of the zero run length (n) and the Golomb parameter (m);
   encode a remainder (R) as a function of the zero run length (n), the Golomb parameter
   (m) and the quotient (Q); and
   concatenate the coded quotient and coded remainder.

2. The processor set forth in claim 1, wherein the quotient (Q) is determined by using an equation $Q=\lfloor n/2^m \rfloor$.

3. The processor set forth In claim 1, wherein the remainder (R) is determined by using an equation $R=n-2^m Q$.

4. The processor set forth in claim 1, wherein the quotient (Q) Is determined by using an equation $Q=n/m$.

5. The processor set forth in claim 1, wherein the processor concatenates the coded quotient with the coded remainder or the coded remainder with the coded quotient.

6. The processor set forth in claim 1, wherein the represented data comprise zero data and non-zero data and the zero run length (n) is associated with the zero data, said processor being further configured to:
   encode the non-zero data as a function of the non-zero data value.

7. The processor set forth in claim 6, wherein the processor encodes the non-zero data by using an equation $$y = \begin{cases} 2x, & \text{if } x \geq 0 \\ 2|x| - 1, & \text{otherwise} \end{cases}$$

where x is the amplitude of the non-zero data to be encoded.

8. The processor set forth in 6, further configured to count the zero run-length (n) and non-zero amplitude values and the corresponding number of times those values occur.

9. A method for encoding quantized frequency represented data comprising:
   determining, by a processor configured to encode quantized frequency represented data, a zero run length (n) of the data;
   determining a Golomb parameter (m) as a function of the zero run length (n) by using an equation $m=\lceil \log_2 n \rceil$;
   encoding a quotient (Q) as a function of the zero run length (n) and the Golomb parameter (m);
   encoding a remainder (R) as a function of the zero run length (n), the Golomb parameter
   (m) and the quotient (Q) and concatenating the coded quotient and coded remainder.

10. The method set forth in claim 9, wherein the quotient (Q) is determined by using an equation $Q=\lfloor n/2^m \rfloor$.

11. The method set forth in claim 9, wherein the remainder (R) is determined by using an equation, $R=n-2^m Q$.

12. The method set forth in claim 9, wherein the quotient (Q) is determined by using an equation $Q=n/m$.

13. The method set forth in claim 9, wherein the concatenation comprises concatenating the coded quotient with the coded remainder or the coded remainder with the coded quotient.

14. The method set forth in claim 9, wherein the represented data comprise zero data and non-zero data and the zero run length (n) is associated with the zero data, said method further comprising:

encoding the non-zero data as a function of the non-zero data value.

15. The method set forth in claim 14, wherein encoding the non-zero data comprises using an equation $$y = \begin{cases} 2x, & \text{if } x \geq 0 \\ 2|x| - 1, & \text{otherwise} \end{cases}$$

where x is the amplitude of the non-zero data to be encoded.

16. The method set forth in 14, further comprising counting the zero run-length (n) and non-zero amplitude values and the corresponding number of times those values occur.

17. An apparatus for encoding quantized frequency represented data comprising:

a first determiner to determine a zero run length (n) of the data;

a second determiner to determine a Golomb parameter (m) as a logarithmic function of the zero run length (n) by using an equation $m = \lceil \log_2 n \rceil$;

an encoder to encode a quotient (Q) as a function of the zero run length (n) and the Golomb parameter (m) and to encode a remainder (R) as a function of the zero run length (n) and the Golomb parameter (m) and the quotient (Q); and concatenater to concatenate the coded quotient and coded remainder.

18. The apparatus set forth in claim 17, wherein the quotient (Q) is determined by using an equation $Q = \lfloor n/2^m \rfloor$.

19. The apparatus set forth in claim 17, wherein the remainder (R) is determined by using an equation $R = n - 2^m Q$.

20. The apparatus set forth in claim 17, wherein the quotient (Q) is determined by using an equation Q=n/m.

21. The apparatus set forth in claim 17, wherein the concatenater concatenates the coded quotient with the coded remainder or the coded remainder with the coded quotient.

22. The apparatus set forth in claim 17, wherein the represented data comprise zero data and non-zero data, further wherein the zero run length (n) is associated with the zero data and further wherein the encoder encodes the non-zero data as a function of the non-zero data value.

23. The apparatus set forth in claim 22, wherein the encoder encodes the non-zero data by using an equation $$y = \begin{cases} 2x, & \text{if } x \geq 0 \\ 2|x| - 1, & \text{otherwise} \end{cases}$$

where x is the amplitude of the non-zero data to be encoded.

24. The apparatus set forth in 22, further comprising a counter to count the zero run-length (n) and non-zero amplitude values and the corresponding number of times those values occur.

25. An apparatus for encoding quantized frequency represented data comprising:

means for determining a zero run length (n) of the data;

means for determining a Golomb parameter (m) as a function of the zero run length (n) by suing an equation $m = \lceil \log_2 n \rceil$;

means for encoding a quotient (Q) as a function of the zero run length (n) and the Golomb parameter (m);

means for encoding a remainder (R) as a function of the zero run length (n) and the Golomb parameter (m) and the quotient (Q); and means for concatenating the coded quotient and coded remainder.

26. The apparatus set forth in claim 25, wherein the quotient (Q) is determined by using an equation $Q = \lfloor n/2^m \rfloor$.

27. The apparatus set forth in claim 25, wherein the remainder (R) is determined by using an equation, $R = n - 2^m Q$.

28. The apparatus set forth In claim 25, wherein the quotient (Q) is determined by using an equation Q=n/m.

29. The apparatus set forth in claim 25, wherein the means for concatenating concatenates the coded quotient with the coded remainder or the coded remainder with the coded quotient.

30. The apparatus set forth in claim 25, wherein the represented data comprise zero data and non-zero data and the zero run length (n) is associated with the zero data, said apparatus further comprising:

means for encoding the non-zero data as a function of the non-zero data value.

31. The apparatus set forth in claim 30, wherein the means for encoding the non-zero data uses an equation $$y = \begin{cases} 2x, & \text{if } x \geq 0 \\ 2|x| - 1, & \text{otherwise} \end{cases}$$

where x is the amplitude of the non-zero data to be encoded.

32. The apparatus set forth in 30, further comprising means for counting the zero run-length (n) and non-zero amplitude values and the corresponding number of times those values occur.

33. A non-transitory, tangible computer readable data storage medium storing code for causing a computer to encode quantized frequency represented data, the code stored on the non-transitory, tangible computer readable data storage medium comprising:

code for causing a computer to determine a zero run length (n) of the data;

code for causing a computer to determine a Golomb parameter (m) as a logarithmic function of the zero run length (n) by using an equation $m = \lceil \log_2 n \rceil$;

code for causing a computer to encode a quotient (Q) as a function of the zero run length (n) and the Golomb parameter (m);

code for causing a computer to encode a remainder (R) as a function of the zero run length (n) and the Golomb parameter (m) and the quotient (Q); and code for causing a computer to concatenate the coded quotient and coded remainder.

34. The tangible computer readable medium set forth in claim 33, wherein the quotient (Q) is determined by using an equation, $Q = \lfloor n/2^m \rfloor$.

35. The tangible computer readable medium set forth in claim 33, wherein the remainder (R) is determined by using an equation $R = n - 2^m Q$.

36. The tangible computer readable medium set forth in claim 33, wherein the quotient (Q) is determined by using an equation Q=n/m.

37. The tangible computer readable medium set forth in claim 33, wherein the code for causing a computer to concatenate comprises concatenating the coded quotient with the coded remainder or the coded remainder with the coded quotient.

38. The tangible computer readable medium set forth in claim 33, wherein the represented data comprise zero data and non-zero data, further wherein the zero run length (n) is associated with the zero data and further wherein the tangible computer readable medium further comprises:

code for causing a computer to encode the non-zero data as a function of the non-zero data value.

39. The tangible readable medium set forth in claim 38, wherein encoding the non-zero data comprises using an equation $$y = \begin{cases} 2x, & \text{if } x \geq 0 \\ 2|x| - 1, & \text{otherwise} \end{cases}$$

where x is the amplitude of the non-zero data to be encoded.

40. The tangible computer readable medium set forth in 38, further comprising code for causing a computer to count the zero run-length (n) and non-zero amplitude values and the corresponding number times those occur.

* * * * *